(12) United States Patent
Brown et al.

(10) Patent No.: US 10,874,095 B1
(45) Date of Patent: Dec. 29, 2020

(54) MOTION SENSING ANIMAL STUN DEVICE

(71) Applicants: Edna Brown, Bloomfield, NJ (US);
Leonard Clarke, Bloomfield, NJ (US)

(72) Inventors: Edna Brown, Bloomfield, NJ (US);
Leonard Clarke, Bloomfield, NJ (US)

( * ) Notice: Subject to any disclaimer, the term of this patent is extended or adjusted under 35 U.S.C. 154(b) by 13 days.

(21) Appl. No.: 14/989,953

(22) Filed: Jan. 7, 2016

(51) Int. Cl.
*A01M 19/00* (2006.01)
*A01M 29/24* (2011.01)
*A01M 99/00* (2006.01)

(52) U.S. Cl.
CPC ............ *A01M 19/00* (2013.01); *A01M 29/24* (2013.01); *A01M 99/00* (2013.01)

(58) Field of Classification Search
CPC ...... A01M 19/00; A01M 23/38; A01M 29/24; A01M 99/00
USPC ............... 43/1, 98, 124; 52/101; 361/232; 116/22 A; 340/573.1, 573.2; 463/47.3; 102/502
See application file for complete search history.

(56) References Cited

U.S. PATENT DOCUMENTS

| | | | | |
|---|---|---|---|---|
| 1,577,903 A * | 3/1926 | Cover | .................... | A63H 3/006 40/411 |
| 4,212,007 A * | 7/1980 | Reyes | .................. | G08B 15/002 340/691.2 |
| 5,603,287 A * | 2/1997 | Houck | ................. | A01K 15/023 119/719 |
| 5,892,446 A * | 4/1999 | Reich | ..................... | A01K 15/02 119/720 |
| 5,936,183 A * | 8/1999 | McNulty, Sr. | ....... | F41H 13/0006 102/426 |
| 7,075,770 B1 * | 7/2006 | Smith | .................. | F41H 13/0025 102/502 |
| 7,246,569 B2 * | 7/2007 | Grandy | ................. | A01M 29/06 116/22 A |
| 7,268,689 B2 * | 9/2007 | Sulaver | .................. | G08B 15/00 340/541 |
| 7,314,007 B2 * | 1/2008 | Su | .......................... | F41B 11/62 102/502 |
| 8,336,462 B2 * | 12/2012 | Danon | ................ | F41H 13/0031 102/502 |
| 8,997,697 B1 * | 4/2015 | Dailey | .................. | A01M 29/16 119/719 |
| 9,044,770 B1 * | 6/2015 | Eyring | ................. | B05B 12/122 |
| 2006/0213449 A1 * | 9/2006 | Dodge | .................. | A01M 29/30 119/329 |
| 2007/0193498 A1 * | 8/2007 | Wells | ..................... | A01M 29/10 116/22 A |
| 2008/0041321 A1 * | 2/2008 | Jong | ..................... | A01M 29/16 119/719 |
| 2012/0069189 A1 * | 3/2012 | Elkins | ..................... | F41B 11/57 348/158 |
| 2014/0022688 A1 * | 1/2014 | Jones | .................. | F41H 13/0018 361/232 |
| 2014/0334058 A1 * | 11/2014 | Galvan | ............... | F41H 13/0025 361/232 |
| 2015/0153144 A1 * | 6/2015 | Cheatham, III | ..... | A61N 1/3987 607/7 |

\* cited by examiner

*Primary Examiner* — Darren W Ark
*Assistant Examiner* — Brady W Frazier

(57) ABSTRACT

A motion sensing animal stun device including a housing in the form of a statue, preferably an animal statue, which has at least one pair of electrode projectiles propelled forwardly by a compressed gas cartridge upon the detection of motion by a motion sensor.

2 Claims, 5 Drawing Sheets

US 10,874,095 B1

MOTION SENSING ANIMAL STUN DEVICE

BACKGROUND OF THE INVENTION

Various types of animal deterrent devices are known in the prior art. However, what is needed is a motion sensing animal stun device with a housing in the form of a statue, preferably an animal statue, which has at least one pair of electrode projectiles propelled forwardly by a compressed gas cartridge upon the detection of motion by a motion sensor. Upon impact of the electrode projectiles with a desired target, such as a wild animal, the target is incapacitated for proper removal and disposition.

FIELD OF THE INVENTION

The present invention relates to animal deterrent devices, and more particularly, to a motion sensing animal stun device.

SUMMARY OF THE INVENTION

The general purpose of the present motion sensing animal stun device, described subsequently in greater detail, is to provide a motion sensing animal stun device which has many novel features that result in a motion sensing animal stun device which is not anticipated, rendered obvious, suggested, or even implied by prior art, either alone or in combination thereof.

To accomplish this, the present motion sensing animal stun device is devised to deter wild animals, such as coyotes, from attacking pets in a yard and preventing the spread of rabies is illustrated. The motion sensing animal stun device includes a housing which can have the structure of a statue, such as in the form of an animal. A motion sensor is disposed at least partially within a front side of the housing. A central processing unit, an actuator, a voltage amplifier, a replaceable compressed gas cartridge, and a power source, such as at least one battery, are disposed within the housing. The actuator is in operational communication with the central processing unit, which activates the actuator upon the detection of motion by the motion sensor. The voltage amplifier is in operational communication with the actuator.

At least one pair of electrode projectiles, disposed within the housing in alignment with a pair of openings in the front side of the housing, is in operational communication with the voltage amplifier. An amount of conductive wiring operationally connects the pair of electrode projectiles to the voltage amplifier. The openings permit passage of the electrode projectiles therethrough. The cartridge is disposed directly adjacent the electrode projectiles. The compressed gas has sufficient pressure for immediately propelling the electrode projectiles from the housing through the openings upon release of the gas through a gas release opening in the cartridge. An access panel, disposed on the housing at the top side, permits removal and replacement the power source, the voltage amplifier, the cartridge, and the electrode projectiles.

The actuator activates the voltage amplifier and the compressed gas cartridge upon the activation of the actuator. Upon activation of the voltage amplifier and the compressed gas cartridge, the volume of gas within the cartridge is released through the gas release opening in the cartridge. Upon the release of the volume of gas through the gas release opening in the cartridge, the pair of electrode projectiles is propelled through the openings. Upon impact of the electrode projectiles with a desired target, such as a wild animal or a burglar, the target is incapacitated and subdued for proper removal and disposition, such as by relocation or arrest, by local authorities. The device can be strategically positioned in a yard or in a structure directly adjacent an entryway, such as a door or a window, to deter would-be intruders.

In the preferred embodiment, the statue has the physical outer structure of an animal having a hollow head on the front side, and a face on the head with the openings being disposed on the face in an eye socket position. The central processing unit, the actuator, the voltage amplifier, the at least one battery, the access panel, and the cartridge are preferably disposed within the head. The electrode projectiles are also initially disposed within the head prior to being propelled through the openings. The motion sensing animal stun device further comprises a chest on the front side of the housing. The motion sensor is disposed at least partially within the chest.

Thus has been broadly outlined the more important features of the present motion sensing animal stun device so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
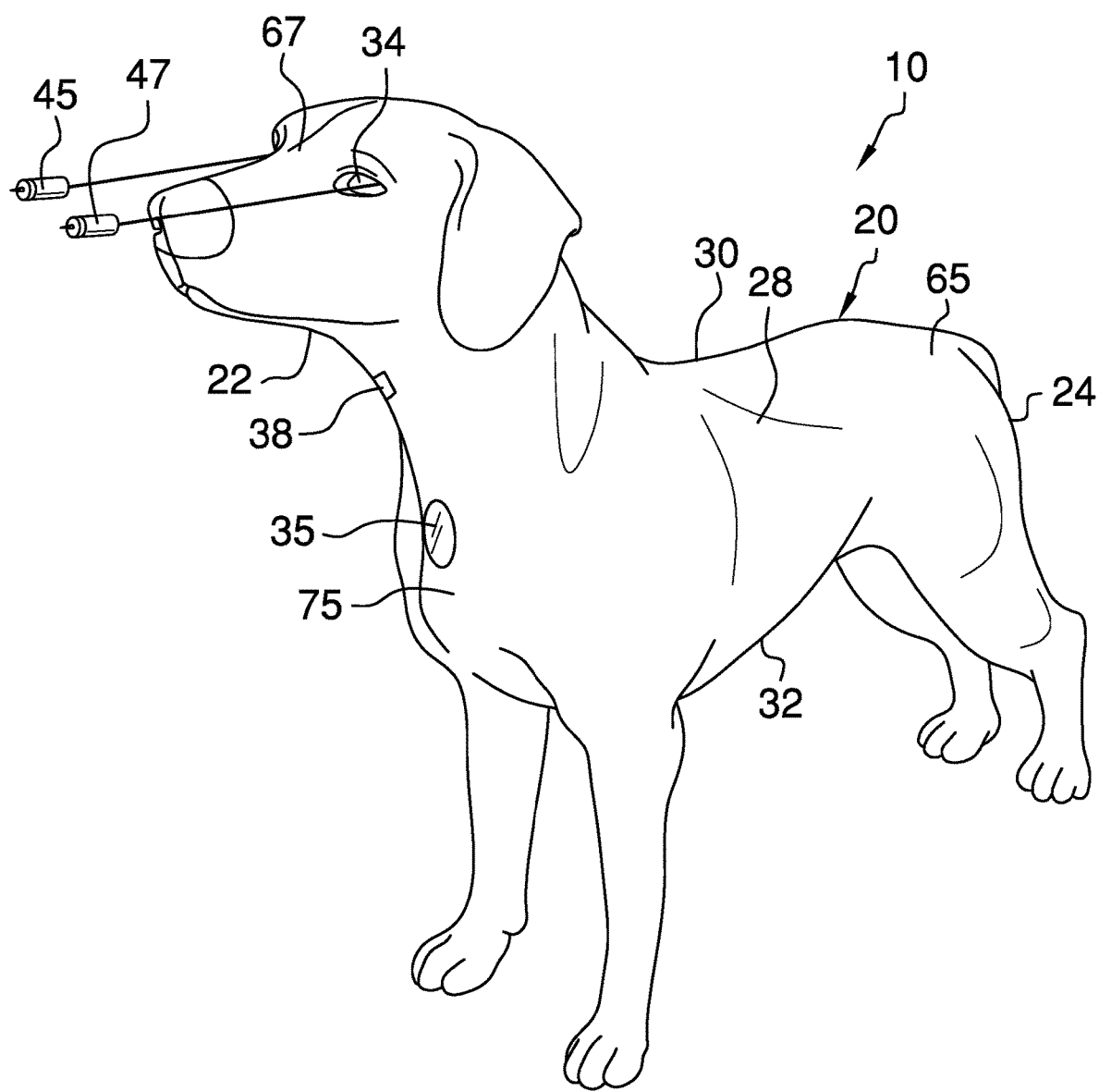
FIG. 1 is a front isometric view.
Figure 2:
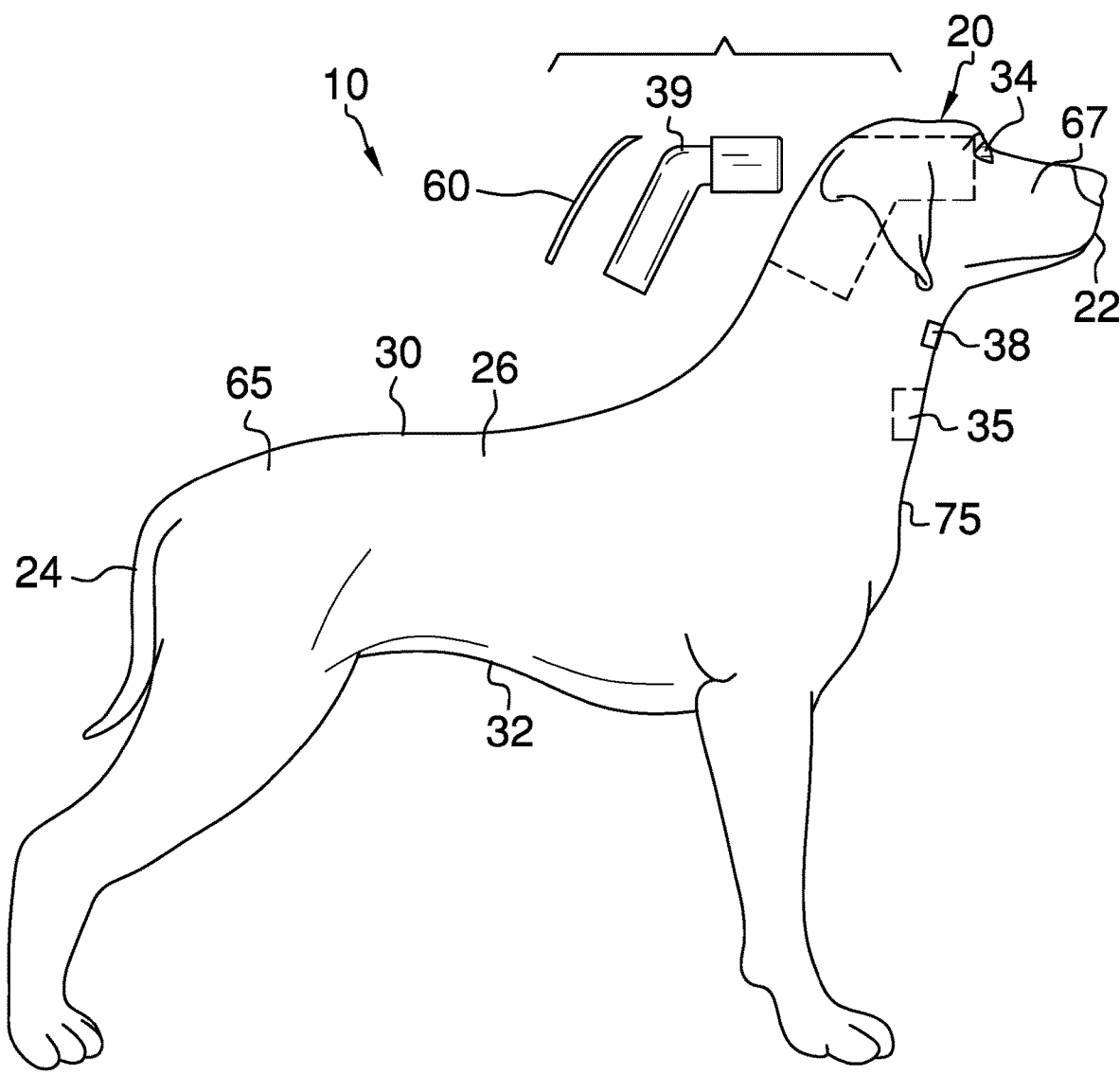
FIG. 2 is a side elevation view.
Figure 3:
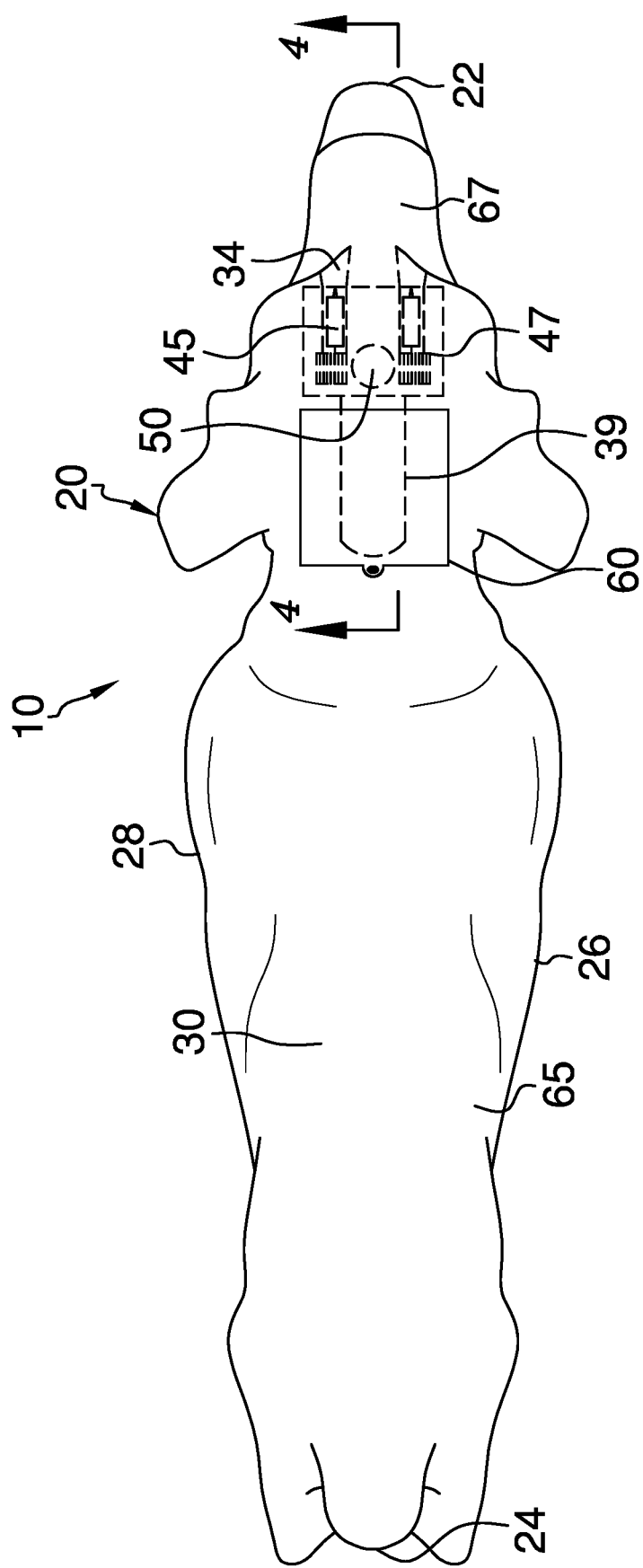
FIG. 3 is a top plan view.
Figure 4:
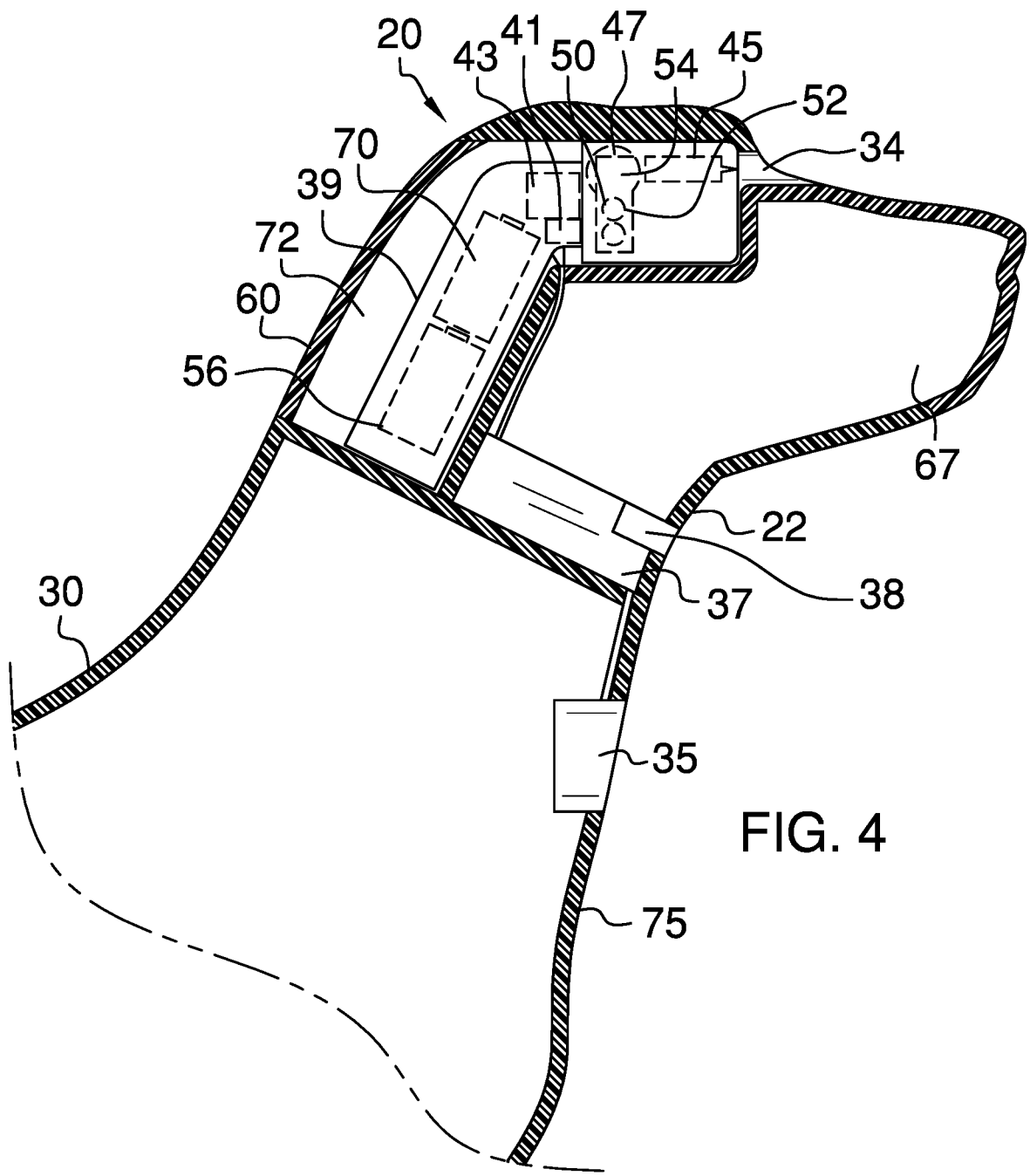
FIG. 4 is a cross-sectional view taken along line 4-4 of FIG. 3.
Figure 5:
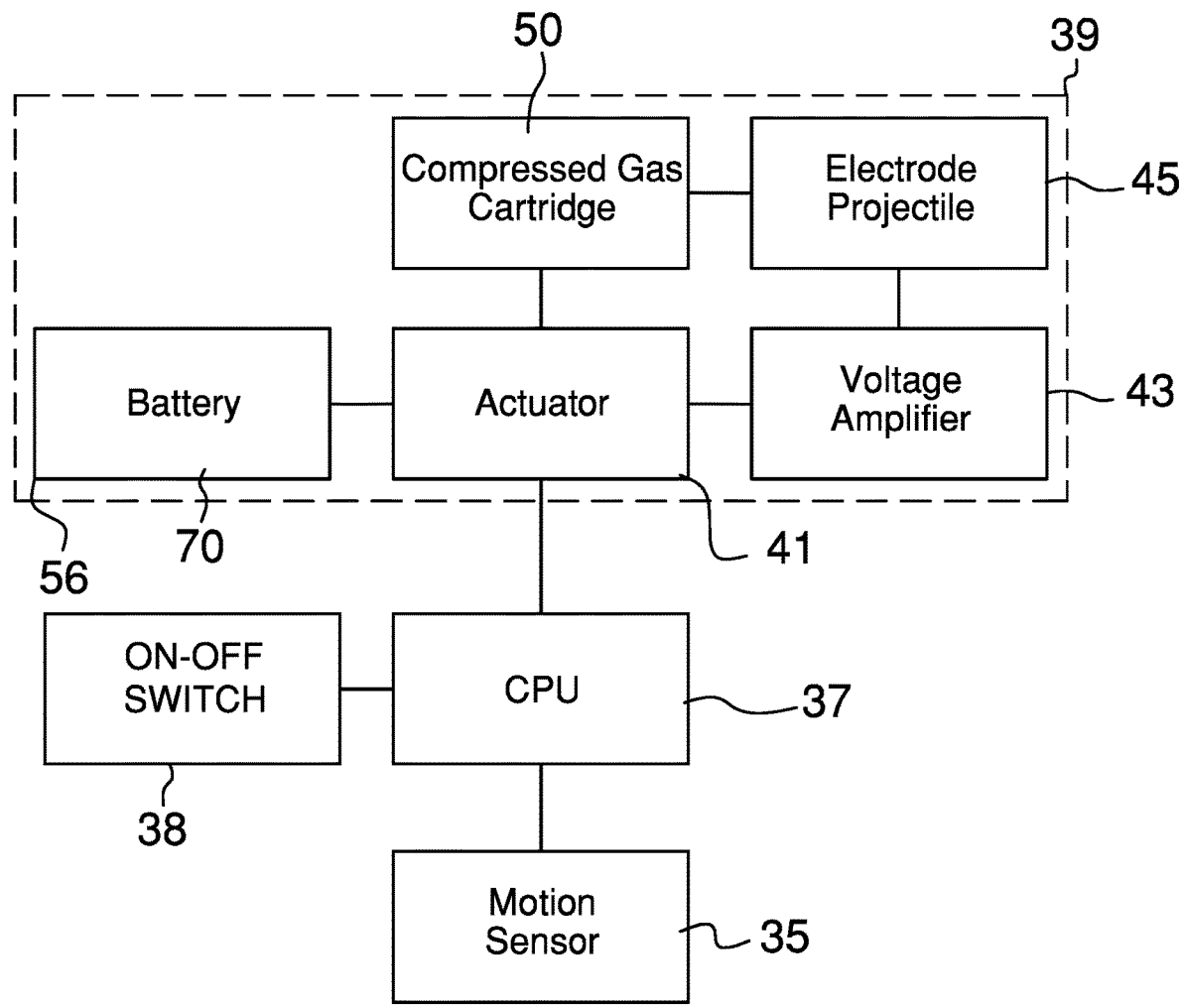
FIG. 5 is a block diagram view of operations.

With reference now to the drawings, and in particular FIGS. 1 through 5 thereof, an example of the instant motion sensing animal stun device employing the principles and concepts of the present motion sensing animal stun device and generally designated by the reference number 10 will be described.

Referring to FIGS. 1 through 5, the present motion sensing animal stun device 10 devised to deter wild animals from attacking pets in a yard is illustrated. The motion sensing animal stun device 10 includes a housing 20. The housing 20 has a front side 22, a rear side 24, a left side 26, a right side 28, a top side 30, and a bottom side 32. The housing 20 is formed of a durable all-weather material. The housing 20 has the structure of a statue. A motion sensor 35 is disposed at least partially within the housing 20 front side 22. A central processing unit 37 is disposed within the housing 20 proximal the motion sensor 35. An on-off switch 38 activates and alternately deactivates the central processing unit 37. An actuator 41 is disposed within the housing 20. The actuator 41 is in operational communication with the central processing unit 37. The central processing unit 37 activates the actuator 41 upon the detection of motion by the motion sensor 35. A voltage amplifier 43 is disposed within the housing 20. The voltage amplifier 43 is in operational communication with the actuator 41.

One pair of electrode projectiles 45 is disposed within the housing 20 in alignment with the pair of openings 34. The pair of electrode projectiles 45 is in operational communication with the voltage amplifier 43. An amount of conductive wiring 47 operationally connects the pair of electrode projectiles 45 to the voltage amplifier 43.

The pair of openings 34 is configured to permit passage of the pair of electrode projectiles 45 therethrough. A cartridge 50 is removably disposed within the housing 20 directly adjacent the pair of electrode projectiles 45. A volume of gas 52 is compressed to a sufficient pressure for immediately propelling the pair of electrode projectiles 45 from the housing 20 through the openings 34 upon release of the volume of gas 52 through a gas release opening 54 in the cartridge 50.

At least one battery 70 is removably disposed in the housing 20. The at least one battery 70 is in operational communication with the motion sensor 35, the central processing unit 37, the actuator 41, and the voltage amplifier 43. An access panel 60 disposed on the housing 20 at the top side 30 proximal each of the at least one battery 70, the voltage amplifier 43, the cartridge 50, and the pair of electrode projectiles 45.

The actuator 41 activates the voltage amplifier 43 and the compressed gas cartridge 50 upon the activation of the actuator 41. Upon activation of the voltage amplifier 43 and the compressed gas cartridge 50, the volume of gas 52 within the cartridge 50 is released through the gas release opening 54 in the cartridge 50. Upon the release of the volume of gas 52 through the gas release opening 54 in the cartridge, the pair of electrode projectiles 45 is propelled through the openings 34.

The statue has the physical outer structure of an animal 65 having a hollow head 72 on the front side 22, and a face 67 on the head 72. A pair of openings 34 is disposed on the face 67 in an eye socket position. The central processing unit 37, the actuator 41, the voltage amplifier 43, the at least one battery 70, the access panel, and the cartridge are preferably disposed within the head 72. The electrode projectiles 45 are also initially disposed within the head 72. The motion sensing animal stun device further comprises a chest 75 on the front side 22 of the housing 20. The motion sensor 35 is disposed at least partially within the chest 75.

The inventors claim:

1. A motion sensing animal stun device comprising:
a housing having a front side, a rear side, a left side, a right side, a top side, and a bottom side, wherein the housing has the structure of a statue, wherein the statue has the physical outer structure of an animal having a hollow head on the front side, and a face on the head;
a pair of openings disposed on the face in an eye socket position;
a motion sensor disposed at least partially within the housing front side;
a central processing unit disposed within the head proximal the motion sensor; an actuator disposed within the head, the actuator being in operational communication with the central processing unit, wherein the central processing unit activates the actuator upon the detection of motion by the motion sensor;
a voltage amplifier disposed within the head, the voltage amplifier in operational communication with the actuator;
one pair of electrode projectiles disposed within the head in alignment with the pair of openings, the pair of electrode projectiles being in operational communication with the voltage amplifier;
an amount of conductive wiring operationally connecting the pair of electrode projectiles to the voltage amplifier;
wherein the pair of openings is configured to permit passage of the pair of electrode projectiles therethrough;
a cartridge removably disposed within the head directly adjacent the pair of electrode projectiles;
a volume of gas compressed to a sufficient pressure for immediately propelling the pair of electrode projectiles from the housing through the openings upon release of the volume of gas through a gas release opening in the cartridge;
at least one battery removably disposed in the head, the at least one battery being in operational communication with the motion sensor, the central processing unit, the actuator, and the voltage amplifier; and
an access panel disposed on the head proximal each of the at least one battery, the voltage amplifier, the cartridge, and the pair of electrode projectiles;
wherein the actuator activates the voltage amplifier and the compressed gas cartridge upon the activation of the actuator;
wherein upon activation of the voltage amplifier and the compressed gas cartridge, the volume of gas within the cartridge is released through the gas release opening in the cartridge; and
wherein upon the release of the volume of gas through the gas release opening in the cartridge, the pair of electrode projectiles is propelled through the openings.

2. The motion sensing animal stun device of claim 1 further comprising a chest on the front side of the housing; wherein the motion sensor is disposed at least partially within the chest.

* * * * *